(12) United States Patent
Darcy (10) Patent No.: US 10,417,192 B2
(45) Date of Patent: Sep. 17, 2019

(54) FILE CLASSIFICATION IN A DISTRIBUTED FILE SYSTEM

(71) Applicant: Red Hat, Inc., Raleigh, NC (US)

(72) Inventor: Jeffrey Jon Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 275 days.

(21) Appl. No.: 14/543,569

(22) Filed: Nov. 17, 2014

(65) Prior Publication Data

US 2016/0140140 A1 May 19, 2016

(51) Int. Cl.
*G06F 16/00* (2019.01)
*G06F 16/182* (2019.01)
*H04L 29/08* (2006.01)

(52) U.S. Cl.
CPC ........ *G06F 16/182* (2019.01); *H04L 67/1097* (2013.01)

(58) Field of Classification Search
CPC .......................... G06F 16/182; H04L 67/1097
See application file for complete search history.

(56) References Cited

U.S. PATENT DOCUMENTS

| | | | | |
|---|---|---|---|---|
| 6,748,447 | B1* | 6/2004 | Basani | H04L 67/1095 709/219 |
| 6,799,206 | B1* | 9/2004 | Workman | G06F 11/1464 707/E17.005 |
| 7,734,593 | B2 | 6/2010 | Prahiad et al. | |
| 8,396,838 | B2 | 3/2013 | Brockway et al. | |
| 8,515,681 | B2 | 8/2013 | Sontrop et al. | |
| 8,805,779 | B2 | 8/2014 | Ficara et al. | |
| 2004/0073639 | A1* | 4/2004 | Basoglu | G06F 9/5083 709/223 |
| 2010/0217793 | A1* | 8/2010 | Preiss | H04L 67/1008 709/203 |
| 2011/0047192 | A1 | 2/2011 | Utsunomiya | |
| 2012/0254175 | A1* | 10/2012 | Horowitz | G06F 17/30584 707/737 |

FOREIGN PATENT DOCUMENTS

| | | |
|---|---|---|
| CN | 101951373 A | 1/2011 |
| CN | 102880668 A | 1/2013 |
| CN | 103780622 A | 5/2014 |

OTHER PUBLICATIONS

Darcy, Jeff. "[Gloster-Devel] Data Classification Proposal". May 23, 2014. retrieved Aug. 28, 2014. http://supercolony.gluster.
Anonymous. "Tiers Without Tears" Jan. 31, 2014. retrieved Aug. 28, 2014. http://pl.atyp.us/2014-01-data-classification.htm.
Simorjay Frank. "Data Classification for Cloud Readiness". retrieved Aug. 28, 2014. https://www.google.com/url?sa=t&rct=j&q=&esrc=s&source=web&cd=1&cad=rja&uact=8&ved=0CDQQFjAA&url=http%3A%2F%2Fdownload.microsoft.Cloud-Readiness.pdf&ei=f1j9U5r-EYGuAThulGgDA&v6u=https%3A%2F%2Fs-v6exp1-ds.metric.gstatic.com%2Fgen_204%3Fip%3D122.162.64.177%26ts%3D1409112191660043%26auth%3DkoszluwufyoSvwhUbJRRw&bvm=bv.74035653,d.c2E. 22 pages.

* cited by examiner

*Primary Examiner* — Usmaan Saeed
(74) *Attorney, Agent, or Firm* — Womble Bond Dickinson (US) LLP; Daniel E. Ovanezian (57) ABSTRACT

A file may be identified and a plurality of rules associated with a plurality of storage servers may be received. An order for the rules may be identified. A particular storage server of the plurality of storage servers that satisfies a condition for each of the rules in view of the order for the rules and a characteristic associated with each of the plurality of storage servers. The file may be stored at the particular storage server that satisfies the condition for each of the rules.

9 Claims, 7 Drawing Sheets

FILE CLASSIFICATION IN A DISTRIBUTED FILE SYSTEM

TECHNICAL FIELD

Aspects of the disclosure generally relate to distributed file systems and, more specifically, relate to file classification in a distributed file system.

BACKGROUND

A distributed file system may include multiple storage servers that are each associated with at least one storage device that is used to store files of the distributed file system. Multiple users may access the distributed file system in order to store different files across the storage servers. For example, a first user may access the distributed file system to store a first file and a second user may access the distributed file system to store a second file in the distributed file system. The first file and the second file may be stored in storage servers of the distributed file system.

The files in a distributed file system may be stored in one of multiple storage servers based on characteristics of each respective file. For example, a first file associated with a first characteristic may be stored in a first storage server and a second file associated with a second characteristic may be stored in a second storage server.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure relate to file classification in a distributed file system. A distributed file system may be a type of cloud computing infrastructure or system that includes multiple servers. The servers of the distributed file system may include or may manage storage resources to store files. Such servers may be referred to as storage servers.

The distributed file system may store files across the storage servers based on an organization that specifies which types of files may be stored on particular storage servers. The storage servers may be associated with different characteristics and a set of rules may be used to identify which storage server may be used to store a particular file based on one or more characteristics of the storage servers and the file. As an example, a first file may be associated with a first characteristic (e.g., a frequently accessed file) and a second file may be associated with a second characteristic (e.g., a file requiring a particular security level). The first file may be stored at a first storage server that is also associated or assigned the first characteristic and the second file may be stored at a second storage server that is associated or assigned the second characteristic.

A set of rules may be used to identify potential storage servers that may be used to store a particular file based on the characteristics of the storage servers. Furthermore, the set of rules may be based on an ordering that specifies when a first rule from the set of rules should be used and which rules may follow the first rule when being used to identify potential storage servers to store or migrate (e.g., move between storage servers) a file. For example, a first rule may be used to identify particular storage servers based on a first characteristic of the storage servers satisfying a condition of the first rule and a second rule may further identify a subset of the identified storage servers that satisfy the first rule based on an additional second characteristic of the identified storage servers. In some embodiments, the condition of each rule may be based on a characteristic of the file.

As an example, a first storage server and a second storage server may be associated with a location characteristic at a same value (e.g., the first column or row within a server rack including multiple storage servers) and a storage type characteristic at different values (e.g., the first storage server is associated with a solid state drive storage type and the second storage server is associated with a disk drive storage type). A third storage server and a fourth storage server may be associated with the location characteristic at another value (e.g., a second column or row within the server rack). A potential storage servers for storing a file may be identified based on an ordering of a first rule and a second rule. A file may be received or identified by a distributed file system and a determination may be made that the file is to be stored at a first column of a server rack on a storage server with a solid state drive storage type (e.g., characteristics of the file). The first rule may be used to identify potential storage servers that are associated with a location characteristic at the first column and the second rule may identify a subset of the identified potential storage servers that also have a solid state drive storage type characteristic. As such, the file may be stored in the first storage server that satisfies a condition of the first rule (e.g., the location characteristic being a first column) and further satisfies the second rule (e.g., the storage type characteristic being a solid state drive).

The ordering of the rules may be used in response to a rebalancing operation for the storage servers of the distributed file system. A rebalancing operation may refer to the migrating (i.e., transferring or moving) of files between the storage servers of the distributed file system to create a more equal distribution of the files that are stored across the storage servers after a change in the configuration of the storage servers of the distributed file system. For example, a first number of storage servers may be used to store files in a distributed file system. One or more additional storage servers may be added to provide additional storage capacity to the distributed file system. Files currently stored on a storage server may be migrated or moved to a new storage server that has been added to the distributed file system. Alternatively, one or more storage servers currently storing files may be removed from the distributed file system. Files currently stored on the storage server that is to be removed may be migrated or moved to one or more other storage servers of the distributed file system. The ordering of the rules may be used to identify potential storage servers that may store the one or more files that are migrated between storage servers.

When the configuration of the storage servers for the distributed file system changes by the adding and/or removing of storage servers, the distribution of files stored across the storage servers may also need to be changed (e.g., through the rebalancing operation). The distributed file system may use multiple rules arranged in an order to migrate or move files between the storage servers. The rules may be used to identify a first set of storage servers that satisfy a first rule and a subset or portion of the first set of storage servers that further satisfy an additional second or more rules. A file may then be migrated to a storage server that satisfies the first rule and the second or more rules.

Figure 1:
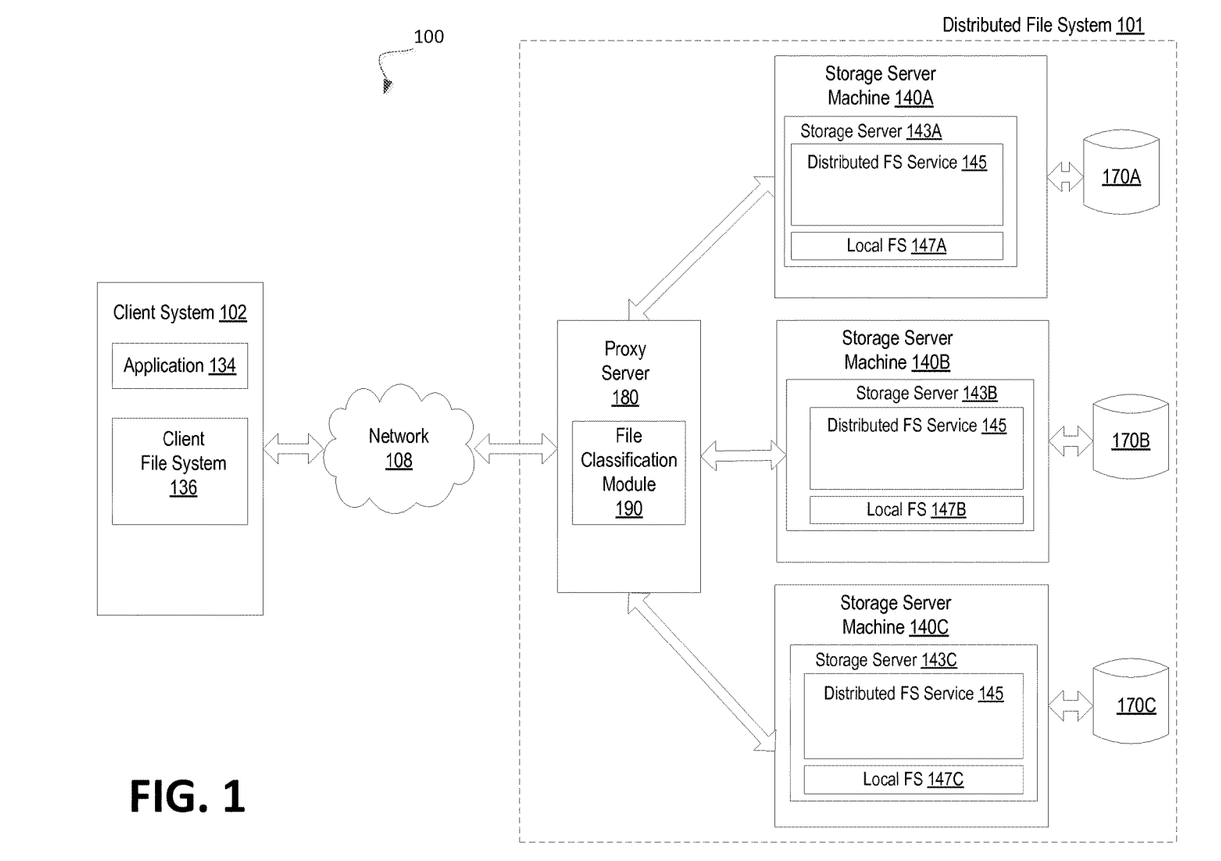
FIG. 1 illustrates an example system architecture in which embodiments of the disclosure may operate.

FIG. 1 is an example system architecture 100 for various implementations of the disclosure. The system architecture 100 may include a distributed file system 101 coupled to one or more client machines 102 via a network 108. The network 108 may be a public network (e.g., the Internet), a private network (e.g., a local area network (LAN) or wide area network (WAN)), or a combination thereof. Network 108 may include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 may be a network attached storage file system that includes one or more storage server machines 140A, 140B, and 140C, each of which may control and manage any number of storage resources 170A, 170B, and 170C. A storage server machine 140A-C may include a network-accessible server-based functionality (e.g., storage server 143A-C) or other data processing equipment. The storage server machines 140A-C may include, but are not limited to, any data processing device, such as a desktop computer, a laptop computer, a mainframe computer, a personal digital assistant, a rack-mount server, a hand-held device or any other device configured to process data. The storage server machines 140A-C of the distributed file system 101 may be grouped into one or more clusters. A cluster may be a group of linked storage servers 143A-C working together closely.

The storage resources 170A-C may be mass storage devices, such as magnetic or optical storage based disks, solid-state drives (SSDs) or hard drives, coupled to the storage server machines 140A-B (either directly or via the network 108). The storage resources 170A-C may also include memory such as random access memory (RAM), Flash memory, and so forth. For convenience, some embodiments provided herein may be described with reference to disks or other mass storage devices. However, it should be understood that such embodiments may also apply to memory storage resources.

Storage servers 143A-C may each host a local file system that manages the storage of data on storage resources 170A-C. Each of the storage resources 170A-C may be formatted in accordance with a particular local file system (FS) 147A-C. The local FS 147A-C may create directories, partitions, logical volumes, and so forth on the storage resources 170A-C as well as store data (e.g., files) thereon. Examples of local disk file systems that may be used on disk storage resources include, but are not limited to, EXT3, EXT4, XFS, NTFS, FAT16, FAT32, and so forth. Various flash file systems, tape file systems, optical disc file systems, memory files systems and so on may alternatively be used for other non-disk storage resources (e.g., for memory storage resources).

Storage servers 143A-C may each additionally include an instance of a distributed file system (FS) service 145. The distributed FS service 145 interfaces with local file systems 147A-C to store files on the storage resources 170A-C, as well as allow retrieval of stored files to the client system 102. The distributed file system service 145 instances additionally interface with one another to form the distributed file system 101.

The distributed file system services 145, and thus the distributed file system 101, may store data as files and may include directories, also referred to as folders, which are virtual containers within the distributed file system 101, in which groups of computer files and possibly other directories may be kept and organized. The distributed file system 101 may organize data (e.g., files) in the disks 170A-C using volumes. A volume may be a single accessible storage area of the distributed file system 101 that may be resident on a single partition or directory of a hardware resource 170A-C (e.g., of a hard disk) of the file system 101. A volume may be a representation of a logical location, rather than a physical location, of a storage area in the file system 101. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

In some embodiments, a volume of the distributed file system 101 may be associated with multiple storage resources 170A-C. Files of a volume may be stored across the storage resources 170A-C. For example, a volume label "C:" may be assigned to a partition or portion of a first storage resource 170A, a partition or portion of a second storage resource 170B, and a partition or portion of a third storage resource 170C. As such, files of a single volume may be distributed between multiple storage resources 170A-C.

Any number of client systems 102 may include a client file system 136 to communicate with the storage servers 143A-C in the distributed file system 101. The client system 102 may a computing device such as a server computer, a desktop computer, a set-top box, a gaming console, a television, a portable computing device such as, and not limited to, mobile telephones, personal digital assistants (PDAs), portable media players, netbooks, laptop computers, electronic book reader, and the like. The client machines 102 may host one or more applications 134. An application 134 may be any type of application including, but not limited to, a web application, a desktop application, a browser application, etc. An application 134 may request access (e.g., read, write, etc.) to the data in the distributed file system 101. For example, the application 134 may request to read or write files stored in a volume associated with storage resources 170A-C.

The distributed file system (FS) service 145 may include a proxy server 180. In some embodiments, the proxy server 180 may receive read and write requests from the client systems 102 and may manage the storing and retrieval of files at the storage resources 170A-C. For example, a file classification module 190 may store or migrate files between the storage resources 170A-C in response to a request to store a file and/or in response to a rebalancing operation. Further details with regard to the file classification module 190 are disclosed below.

Figure 2:
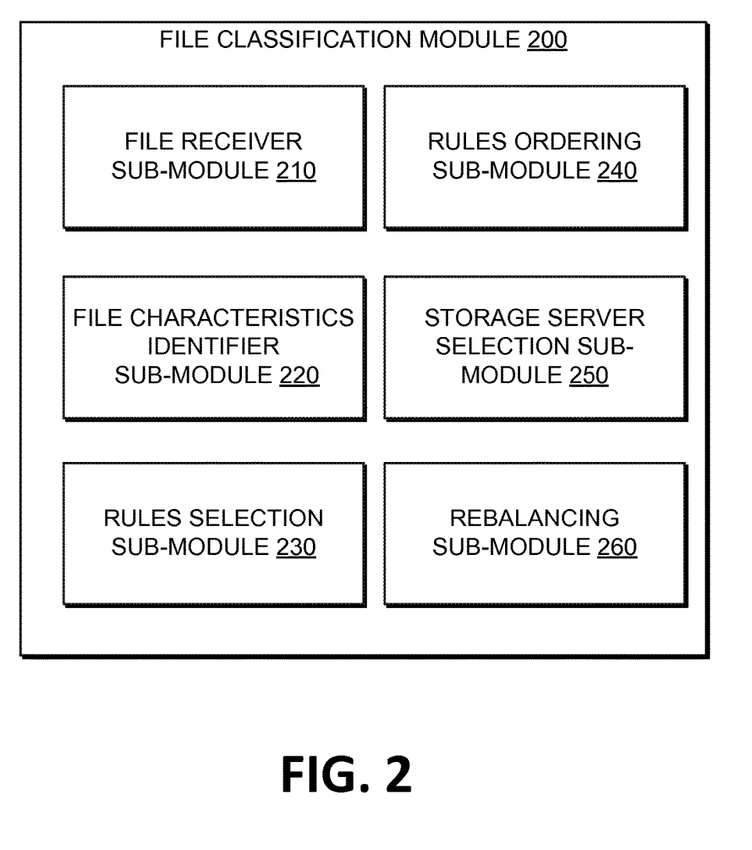
FIG. 2 illustrates an example file classification module in accordance with some embodiments of the disclosure.

FIG. 2 is a block diagram of an example file classification module 200. In general, the file classification module 200 may correspond to the file classification module 190 of FIG. 1. The file classification module 200 may include a file receiver sub-module 210, a file characteristics identifier sub-module 220, a rules selection sub-module 230, a rules ordering sub-module 240, a storage server selection sub-module 250, and a rebalancing sub-module 260. In alternative embodiments, the functionality of one or more of the sub-modules may be combined or divided.

As shown in FIG. 2, the file location module 200 may include a file receiver sub-module 210. In some embodiments, the file receiver sub-module 210 may receive a request to store or create a file in a distributed file system. For example, a client system may access the distributed file system and may request to have a file stored in the distributed file system. In alternative embodiments, the file receiver sub-module 210 may receive or identify a file that is currently stored in a storage server of the distributed file system in response to a rebalancing operation that is at least partly based on the storage server.

The rules selection sub-module 230 may select or identify one or more rules to be used to store a file in a particular storage server. For example, the rules selection sub-module 230 may select multiple rules that may be applied to determine one or more potential storage servers from multiple storage servers that may be used to store a file. Furthermore, the rules ordering sub-module 240 may identify an ordering for the rules. In some embodiments, the ordering may identify that a first rule should be used to identify a first set of storage servers (e.g., a first and second storage server from multiple storage servers) and a second rule should be subsequently be used to identify a subset or portion of the first set of storage servers (e.g., the first storage server) that may be used to store the file. Further details with regard to the ordering of rules are described in further detail below.

The storage server selection sub-module 250 may select a storage server to be used to store a file based on the ordering of the rules. For example, the rules ordering sub-module 240 may identify that a first rule may be used to identify a first set of storage servers from a plurality of storage servers and a second rule may be used to identify a subset or portion of the first set of the storage servers. In some embodiments, the storage server selection sub-module 250 may store the file in one of the storage servers that satisfies the first rule and the second rule (e.g., one storage server from the subset of the first portion). Although a first rule and a second rule are described, any number of rules may be used. Furthermore, if multiple storage servers satisfy all of the identified rules in the specified order, then one of the multiple storage servers may be selected to store the file. For example, if a first storage server and a second storage server each satisfy a first rule and a second rule, then the storage server selection sub-module 250 may select one of the first storage server or the second storage server to store the received file. In some embodiments, the storage server selection sub-module 250 may store the file in the storage server that currently stores the least amount of data (e.g., the fewer number of files) so that a distribution of files stored in the storage servers is more equal (e.g., storage servers are storing similar numbers of files).

The rebalancing sub-module 260 may perform a rebalancing operation. For example, the rebalancing operation may identify files stored on storage servers that are subject to the rebalancing operation. Such identified files may be identified and/or received by the file receiver sub-module 210 and the identified files may then be migrated to storage servers based on the rules and the ordering of the rules.

Figure 3:
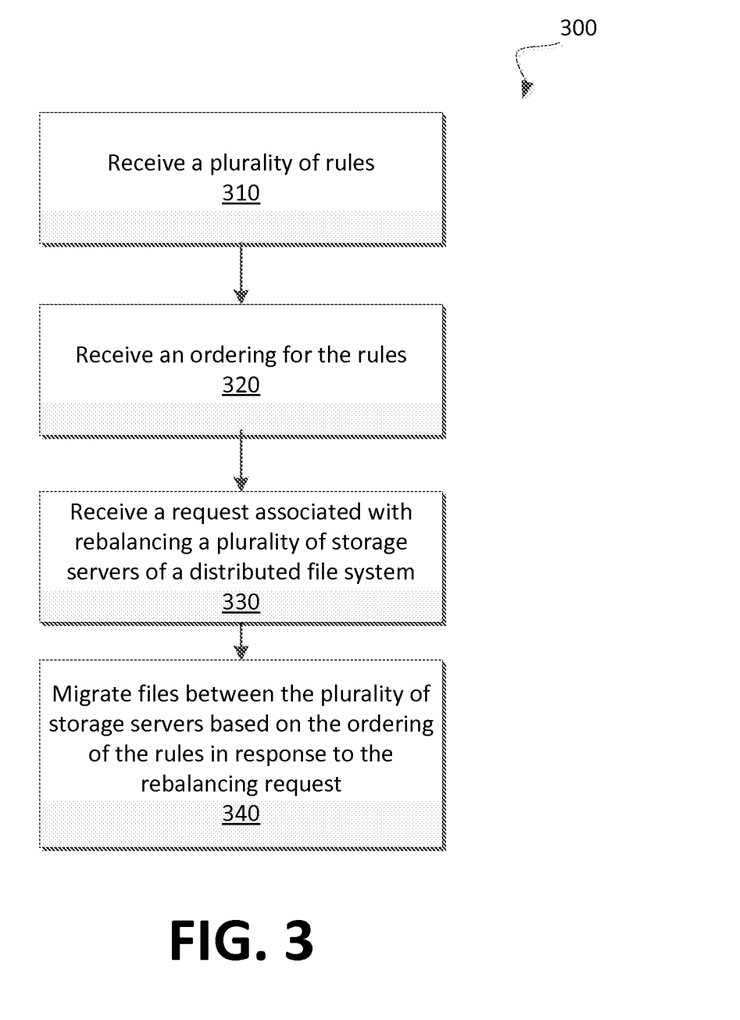
FIG. 3 is a flow diagram of an example method to perform a rebalancing operation on storage servers of a distributed file system based on an ordering of rules in accordance with some embodiments.

FIG. 3 is a flow diagram of an example method 300 to perform a rebalancing operation on storage servers of a distributed file system based on an ordering of rules. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a file classification module 190 or 200 of a proxy server associated with a distributed file system.

As shown, the method 300 may begin by the processing logic receiving a plurality of rules (block 310). In some embodiments, the processing logic may receive multiple rules that are to be used to identify one or more potential storage servers that may be used to store a file that is currently stored on another storage server of a distributed file system. A rule may refer to a condition based on one or more characteristics of a storage server. For example, a rule may be used to identify potential storage servers that may be used to store a file when a characteristic of a storage server matches a condition associated with the rule. As an example, a rule may specify that a file associated with a particular user may be required to be stored in a storage server associated with a location characteristic at a particular location (e.g., in a particular column or row of a server rack including multiple storage servers). As another example, a rule may specify that a particular file may be required to be stored in a storage server associated with a storage server associated with a storage type characteristic at a particular type of storage (e.g., the file should be stored in a storage server based on a solid state drive).

Referring to FIG. 3, the processing logic may receive an ordering for the rules (block 320). For example, the processing logic may identify a first rule of a plurality of rules that should be first used to identify a first set of potential storage servers from a larger group of storage servers and that a second rule may be used to identify a subset or portion of the first set of storage servers. As an example, the ordering may identify that a rule based on storage server types (e.g., a first characteristic) may first be used to identify a first set of storage servers and that another rule based on locations of storage servers (e.g., a second characteristic) may be subsequently used to identify a subset or portion of the first set of storage servers based on the locations of each of the first set of storage servers.

The processing logic may receive a request associated with rebalancing a plurality of storage servers of a distributed file system (block 330). In some embodiments, the rebalancing operation may migrate or move one or more files from a first storage server to a second storage server based on the distribution of the files. The request for the rebalancing operation may be submitted by a user (e.g., an administrator of the distributed file system) or the rebalancing operation may be requested after the changing of the configuration of storage servers associated with the distributed file system. Further details with regard to a rebalancing operation are disclosed in conjunction with FIGS. 4A-4B.

The processing logic may further migrate files between the plurality of storage servers based on the ordering of the rules in response to the rebalancing request (block 340). For example, a file may be moved from a first storage server to a second storage server based on the ordering of the rules.

Figure 4A:
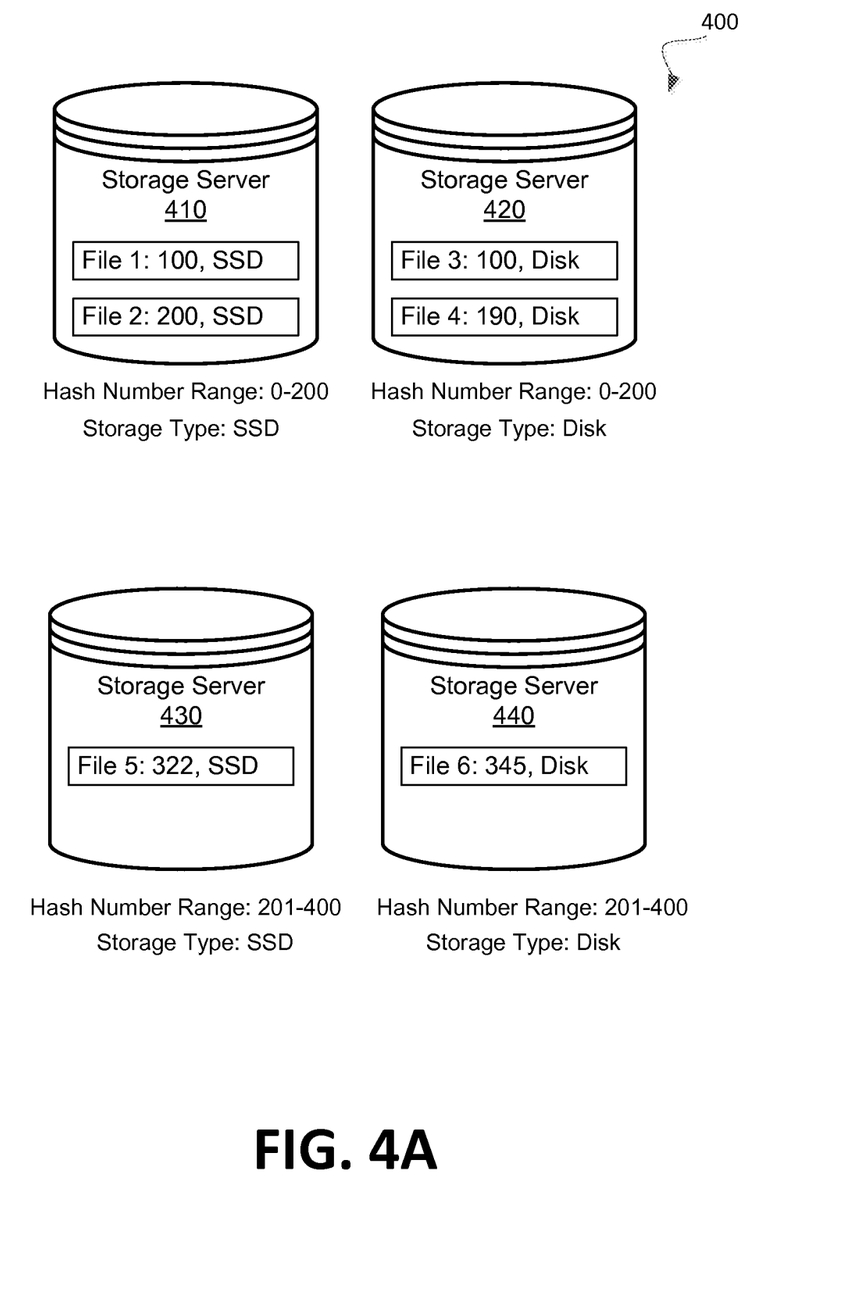
FIG. 4A is an illustrated example of files stored in storage servers of a distributed file system in accordance with some embodiments of the disclosure.

FIG. 4A is an illustrated example 400 of files stored in storage servers of a distributed file system. In general, the example 400 may illustrate files of a volume stored in storage servers of the distributed file system based on characteristics of the storage servers satisfying a condition of one or more rules.

As shown, storage servers 410, 420, 430, and 440 may each store one or more files based on one or more characteristics of the storage servers and/or or conditions associated with the file. For example, the files may be stored based on a type of storage associated with the file and a hash number that is calculated for the file and the storage servers may be associated with different storage device types hash number ranges (e.g., a hash number range characteristic). In some embodiments, the files may also be stored based on a first characteristic of the storage servers. For example, the first characteristic of the storage servers may be a storage type characteristic and a first rule may identify a first set of potential storage servers having a particular storage type characteristic. Examples of a storage type for a storage server include, but are not limited to, solid state drives (SSDs) and disk drives. The files may also be stored based on a second characteristic of the storage servers. For example, the second characteristic may be based on hash number ranges. A hash algorithm may map data of arbitrary length (e.g., a name of the file) to data of a fixed length (e.g., the hash number). Accordingly, when a file is to be stored in the distributed file system, a hash number may be calculated based on the name of the file, and a second rule in view of a condition associated with hash number ranges may identify potential storage servers in view of assigned hash number ranges of the storage servers. For example, potential storage servers of the first set of potential storage servers identified by the first rule for storing the file may be further identified from the storage servers with hash number ranges that include the hash number calculated from the name of the file). As shown, the storage servers 410 and 420 may be assigned hash number ranges of 0-200 and the storage servers 430 and 440 may be assigned hash number ranges between 201-400. Furthermore, the storage servers 410 and 430 may be associated with a solid state drive storage type characteristic and the storage servers 420 and 440 may be associated with a disk drive storage type characteristic. Accordingly, the storage server 410 may store files with a hash number in the range of 0-200 that should be stored in a storage server with a solid state drive. Files may be stored on the storage servers 420, 430, and 440 based on the storage servers satisfying conditions from rules associated with the files.

Figure 4B:
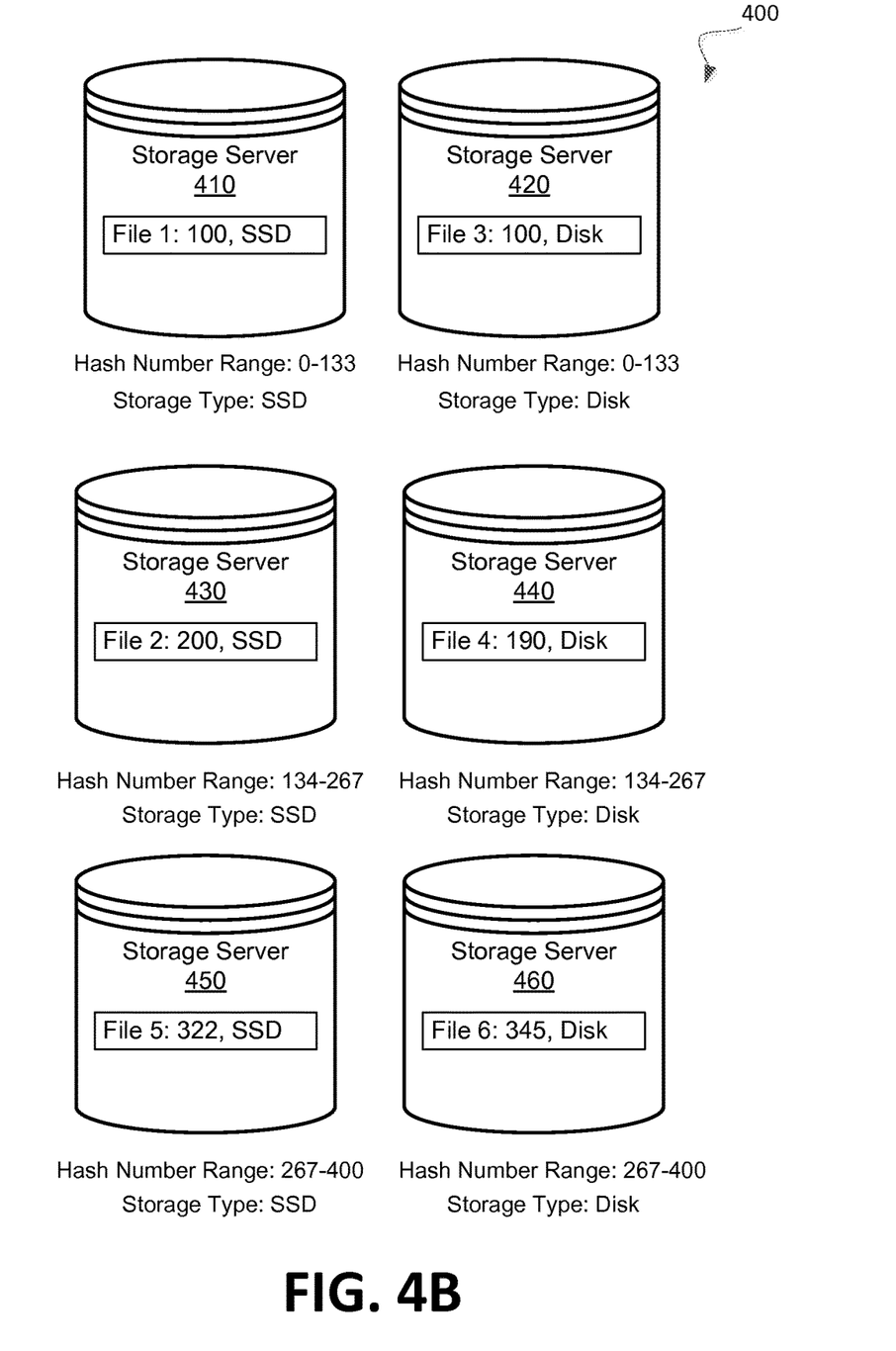
FIG. 4B is an illustrated example of files that were previously stored in storage servers of a distributed file system being migrated to new storage servers based on an ordering of rules in accordance with some embodiments.

FIG. 4B is an illustrated example 450 of files that were previously stored in storage servers of a distributed file system being migrated to new storage servers based on an ordering of rules. In general, the example 450 may correspond to the example 400 after the changing of a configuration of a distributed file system by the adding of additional storage servers and the performing of a rebalancing operation on the storage servers.

As shown, the configuration of available storage servers may be changed by the adding of storage servers 450 and 460 in addition to the storage servers 410, 420, 430, and 440. In response to the adding of the storage servers 450 and 460, the assigned hash number range characteristics for the storage servers 410, 420, 430, and 440 may be changed as part of a rebalancing operation. For example, the storage servers 410 and 420 may be changed from a hash number range of 0-200 to a hash number range of 0-133 and the storage servers 430 and 440 may be changed from a hash number range of 201-400 to a hash number range of 134-267. The added storage servers 450 and 460 may be assigned the hash number range of 267-400. Furthermore, files currently stored on the storage servers 410, 420, 430, and 440 may be moved to another storage server based on an ordering of rules. For example, a first rule may specify that a potential storage server that may be used to store a file must be associated with a storage type characteristic and that a second rule may specify a hash number range that includes the hash number for a file for the storage server that may be used to store the file. As an example, "File 2" may be identified and the first rule may identify storage servers 410, 430, and 450 as potential storage servers to store "File 2" since storage servers 410, 430, and 450 satisfy a condition of the first rule that the file is to be stored in a storage server with a particular storage type characteristic (e.g., the file is associated with a SSD storage type characteristic and storage servers 410, 430, and 450 are associated with a storage type characteristic of SSD). Furthermore, a second rule may identify a subset of the storage servers 410, 430, and 450 based on a condition of the second rule that the file is to be stored in a storage server with an assigned hash number range that includes the hash number for the file. Accordingly, the file may be moved from the storage server 410 to the storage server 430.

Although the above example refers to hash values and storage type characteristics, any characteristics of storage servers and/or files may be used for a rule to identify potential storage servers to store a file. Examples of such characteristics include, but are not limited to, a user or client system associated with the file (e.g., the user or client system who has provided the file), a location characteristic within a server rack or geographic location, a storage media type, security level (e.g., a security level associated with a file being matched with a storage server that provides a satisfactory security level), regulatory compliance (e.g., a required regulatory compliance associated with a file being matched with a storage server that satisfies rules or regulations associated with the required regulations), etc. As an example, a storage server may be associated with a location that specifies that the storage server is in a first row of a server rack, is associated with a solid state drive media type, and provides a particular security level. If a file is associated with a first rule based on the first row, a second rule based on a solid state drive media type, and a third rule for the particular security level, then the storage server may be identified as a potential storage server for storing the file.

In some embodiments, the last rule of the ordering of rules may be associated with the hash number ranges as previously described. For example, a first rule may be used to identify a first set of storage servers that satisfy a first condition associated with a storage type. A second rule may be used to identify a subset or a portion of the first set of storage servers that satisfy a second condition associated with a security level. A final rule based on the hash number ranges as previously described may be used to distribute the file to one storage server identified by the second rule.

Figure 5:
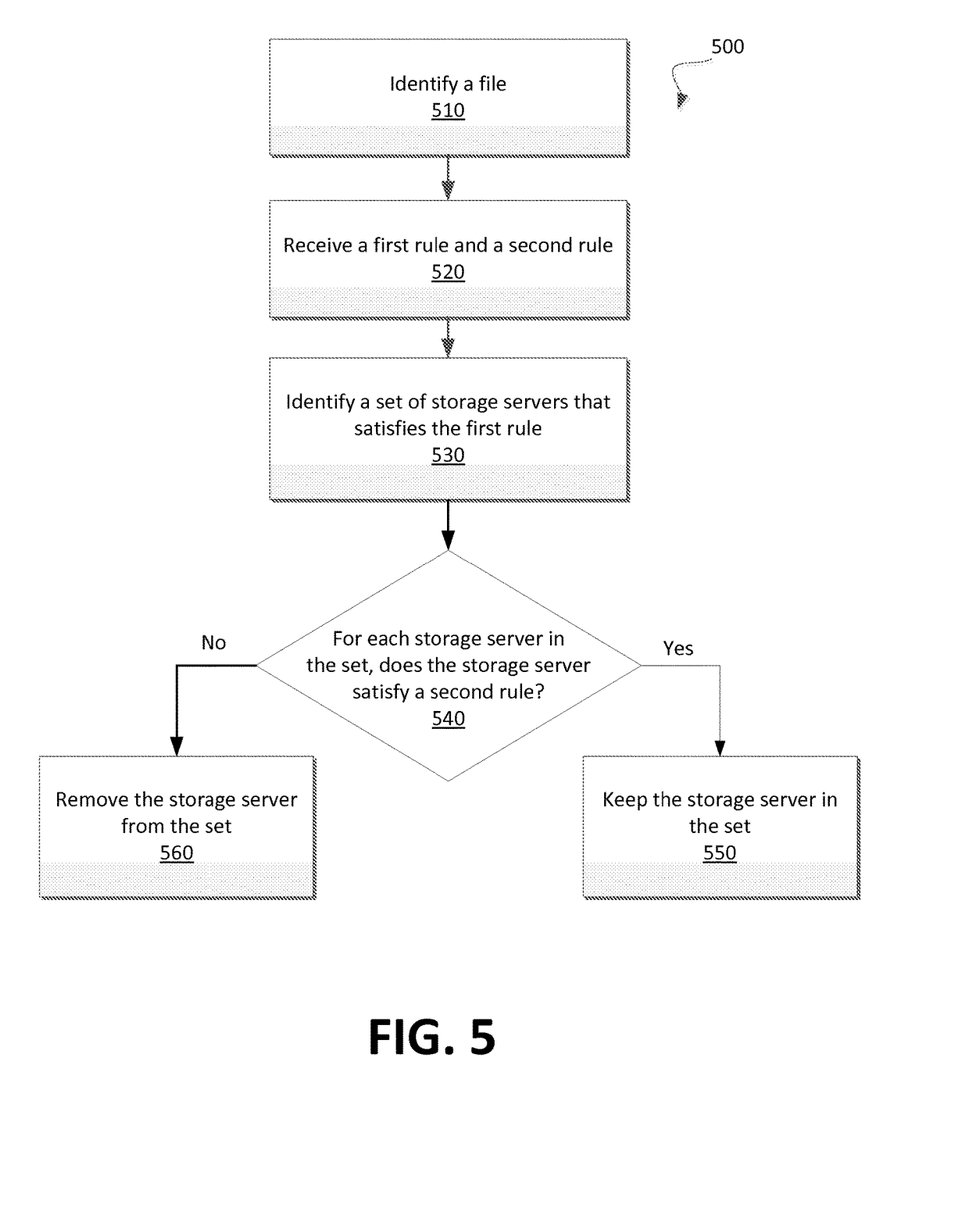
FIG. 5 is a flow diagram of an example method to store a file in a storage server based on an ordering of rules in accordance with some embodiments.

FIG. 5 is a flow diagram of an example method 500 to store a file in a storage server based on an ordering of rules. The method 500 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 500 may be performed by a file classification module 190 or 200 of a proxy server associated with a distributed file system.

The method 500 may begin with the processing logic identifying a file (block 510). In some embodiments, the identified file may be received from a user or client system to be stored or created in a distributed file system or may be a file currently stored on a storage server that is subject to a rebalancing operation. The processing logic may further receive a first rule and a second rule (block 520). In some embodiments, additional rules may be received. Furthermore, the processing logic may identify a set of storage servers that satisfies the first rule (block 530). For example, the first rule may specify a condition based on the file that the a storage server is to satisfy to be included in the set of storage servers. For example, a portion of a plurality of storage servers may be identified based on each storage server of the portion satisfying the first condition After the satisfying of the first rule by the each storage server identified in the set, a determination may be made as to whether each of the storage servers of the set of storage servers satisfies a second rule (block 540). For example, the second rule may specify a second condition based on the file that each storage server of the set of storage servers is also to satisfy. If a particular server does satisfy the second rule, then the particular storage server may remain in the set of storage servers as a potential storage server to store the file (block 550). However, if the particular storage server does not satisfy the second rule, then the particular storage server may be removed from the set and may not be considered a potential storage server to store the file (block 560). Instead, the file may be stored in storage server of the set of storage servers that satisfies the first rule and the second rule. Furthermore, in some embodiments, the file may then be stored based on hash number ranges for the remaining storage servers of the set of storage servers. For example, the first rule may identify seven out of ten storage servers that satisfy the first rule and the second rule may identify three out of the seven storage servers that satisfy the first rule that subsequently satisfy a second rule. The file may be stored at one of the three storage servers based on a third rule that is associated with hash number ranges.

Figure 6:
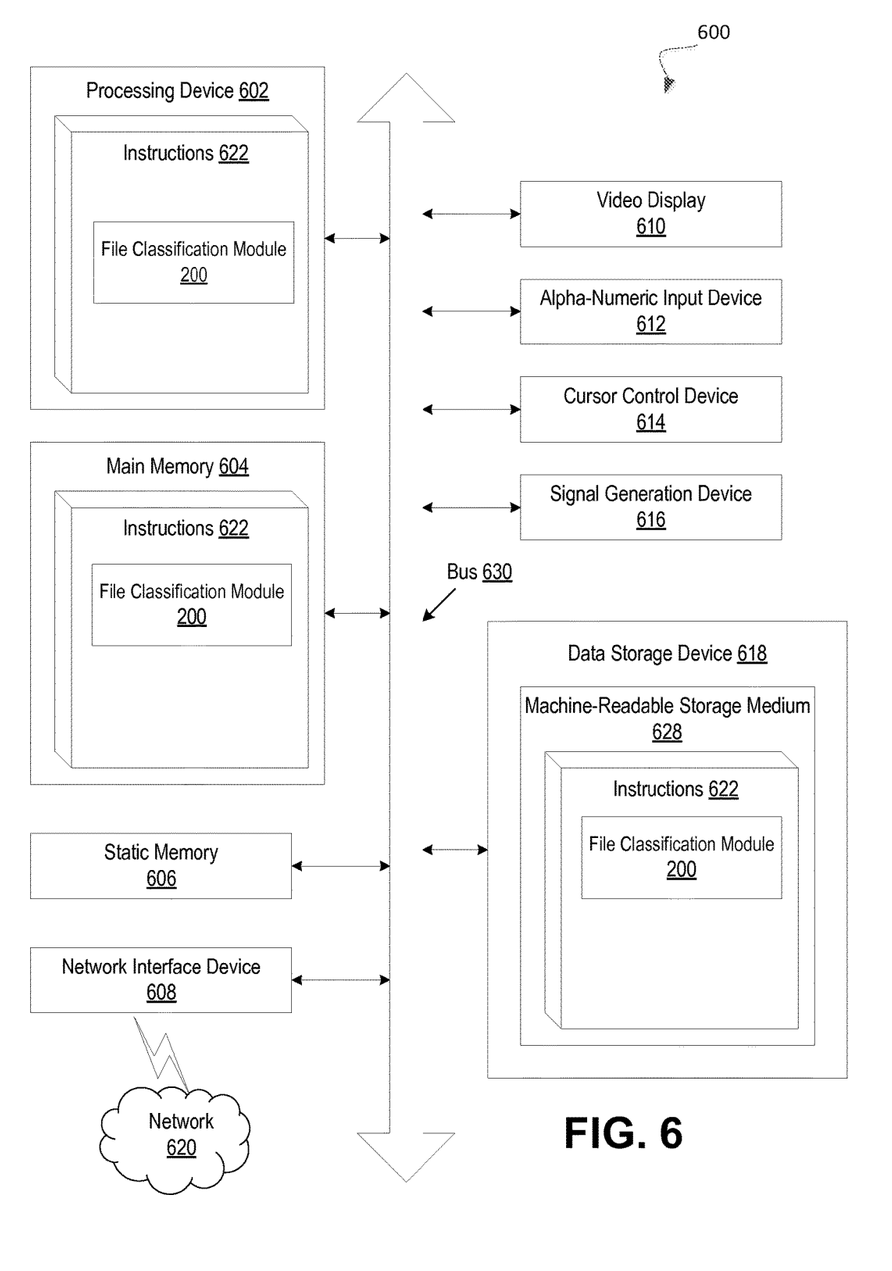
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a file classification module (e.g., file classification module 190 of FIG. 1 and/or file classification module 200 of FIG. 2) and/or a software library containing methods that call modules or sub-modules in a file classification module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving an indication of a change to a configuration of a distributed file system comprising a plurality of storage servers;
receiving a plurality of rules associated with the plurality of storage servers;
identifying an order for the plurality of rules;
determining, by a processing device, a particular storage server of the plurality of storage servers that satisfies a condition for each of the plurality of rules in view of the order for the plurality of rules and a characteristic associated with each of the plurality of storage servers;
in response to the indication of the change to the configuration of the distributed file system, migrating a file from one of the plurality of storage servers to the particular storage server of the plurality of storage servers that satisfies the condition for each of the plurality of rules, wherein the migrating of the file is further in response to a request to perform a rebalancing operation associated with the plurality of storage servers, wherein a final rule specified by the order for the plurality rules corresponds to matching a calculated hash number associated with the file with a hash number range associated with the particular storage server, wherein each of the plurality of storage servers is associated with a hash value range; and
in response to the indication of the change to the configuration of the distributed file system, changing a particular hash value range for the particular storage server, wherein the migrating of the file is in view of the changed hash value range for the particular storage server.

2. The method of claim 1, wherein the changing of the configuration of the plurality of storage servers is associated with an adding or removing of at least one storage server of the plurality of storage servers, and wherein the rebalancing operation is associated with a distribution of a plurality of files stored at the plurality of storage servers.

3. The method of claim 1, wherein the determining of the particular storage server of the plurality of storage servers that satisfies the condition for each of the plurality of rules in view of the order for the plurality of rules and the characteristic associated with each of the plurality of storage servers comprises:
identifying a first set of storage servers from the plurality of storage servers with a first characteristic that satisfies a first condition associated with a first rule of the plurality of rules specified by the order for the plurality of rules; and
identifying the particular storage server from the first set of storage servers with a second characteristic that satisfies a second condition associated with the second rule of the plurality of rules specified by the order for the plurality of rules.

4. A system, comprising:
a memory; and
a processing device, operatively coupled with the memory, to:
receive an indication of a change to a configuration of a distributed file system comprising a plurality of storage servers;
receive a plurality of rules associated with the plurality of storage servers;

identify an order for the plurality of rules;
determine a particular storage server of the plurality of storage servers that satisfies a condition for each of the plurality of rules in view of the order for the plurality of rules and a characteristic associated with each of the plurality of storage servers;
in response to the indication of the change to the configuration of the distributed file system, migrate at least one file from one of the plurality of storage servers to the particular storage server of the plurality of storage servers that satisfies the condition for each of the plurality of rules, wherein the migrating of the at least one file is further in response to a request to perform a rebalancing operation associated with the plurality of storage servers, wherein a final rule specified by the order for the plurality rules corresponds to matching a calculated hash number associated with the file with a hash number range associated with the particular storage server, wherein each of the plurality of storage servers is associated with a hash value range; and
in response to the indication of the change to the configuration of the distributed file system, change a particular hash value range for the particular storage server, wherein the migrating of the file is in view of the changed hash value range for the particular storage server.

5. The system of claim 4, wherein the changing of the configuration of the plurality of storage servers is associated with an adding or removing of at least one storage server of the plurality of storage servers, and wherein the rebalancing operation is associated with a distribution of a plurality of files stored at the plurality of storage servers.

6. The system of claim 4, wherein to determine the particular storage server of the plurality of storage servers that satisfies the condition for each of the plurality of rules in view of the order for the plurality of rules and the characteristic associated with each of the plurality of storage servers, the processing device is further to:
identify a first set of storage servers from the plurality of storage servers with a first characteristic that satisfies a first condition associated with a first rule of the plurality of rules specified by the order for the plurality of rules; and
identify the particular storage server from the first set of storage servers with a second characteristic that satisfies a second condition associated with the second rule of the plurality of rules specified by the order for the plurality of rules.

7. A non-transitory machine-readable storage medium comprising data that, when accessed by a processing device, cause the processing device to:
receive an indication of a change to a configuration of a distributed file system comprising a plurality of storage servers;
receive a plurality of rules associated with the plurality of storage servers;
identifying an order for the plurality of rules;
determine, by the processing device, a particular storage server of the plurality of storage servers that satisfies a condition for each of the plurality of rules in view of the order for the plurality of rules and a characteristic associated with each of the plurality of storage servers;
in response to the indication of the change to the configuration of the distributed file system, migrate a file from one of the plurality of storage servers to the particular storage server of the plurality of storage servers that satisfies the condition for each of the plurality of rules, wherein the migrating of the file is further in response to a request to perform a rebalancing operation associated with the plurality of storage servers, wherein a final rule specified by the order for the plurality rules corresponds to matching a calculated hash number associated with the file with a hash number range associated with the particular storage server, wherein each of the plurality of storage servers is associated with a hash value range; and
in response to the indication of the change to the configuration of the distributed file system, changing a particular hash value range for the particular storage server, wherein the migrating of the file is in view of the changed hash value range for the particular storage server.

8. The non-transitory machine-readable storage medium of claim 7, wherein the changing of the configuration of the plurality of storage servers is associated with an adding or removing of at least one storage server of the plurality of storage servers, and wherein the migrating is associated with a rebalancing operation that is associated with a distribution of a plurality of files stored at the plurality of storage servers.

9. The non-transitory machine-readable storage medium of claim 7, wherein to determine the particular storage server of the plurality of storage servers that satisfies the condition for each of the plurality of rules in view of the order for the plurality of rules and the characteristic associated with each of the plurality of storage servers, the processing device is further to:
identify a first set of storage servers from the plurality of storage servers with a first characteristic that satisfies a first condition associated with a first rule of the plurality of rules specified by the order for the plurality of rules; and
identify the particular storage server from the first set of storage servers with a second characteristic that satisfies a second condition associated with the second rule of the plurality of rules specified by the order for the plurality of rules.

* * * * *